(12) United States Patent
Akiyoshi et al.

(10) Patent No.: US 9,696,577 B2
(45) Date of Patent: Jul. 4, 2017

(54) REFLECTIVE TYPE DISPLAY DEVICE (71) Applicant: Japan Display Inc., Minato-ku (JP)

(72) Inventors: Muneharu Akiyoshi, Mianto-ku (JP);
Kisako Ninomiya, Minato-ku (JP);
Yasushi Kawata, Minato-ku (JP);
Hirotaka Hayashi, Minato-ku (JP);
Arichika Ishida, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/931,109

(22) Filed: Nov. 3, 2015

(65) Prior Publication Data
US 2016/0131939 A1    May 12, 2016

(30) Foreign Application Priority Data

Nov. 10, 2014 (JP) ................................. 2014-227899
Aug. 10, 2015 (JP) ................................. 2015-157947

(51) Int. Cl.
*G02F 1/1333* (2006.01)
*G02F 1/1335* (2006.01)
*G02F 1/1362* (2006.01)

(52) U.S. Cl.
CPC ...... *G02F 1/133502* (2013.01); *G02F 1/1362* (2013.01); *G02F 1/136209* (2013.01)

(58) Field of Classification Search
CPC ......... G02F 1/133553; G02F 1/136209; G02F 1/133512; G02F 1/13363
USPC ..................... 349/113, 44, 110, 117
See application file for complete search history.

(56) References Cited

U.S. PATENT DOCUMENTS

2006/0226427 A1\* 10/2006 Yamasaki ......... G02F 1/136213
257/59

FOREIGN PATENT DOCUMENTS

JP   2002-365664   12/2002

\* cited by examiner

*Primary Examiner* — Thanh-Nhan P Nguyen
(74) *Attorney, Agent, or Firm* — Oblon, McClelland, Maier & Neustadt, L.L.P.

(57) ABSTRACT

According to one embodiment, a reflective type liquid crystal display device provided can suppress light leakage into a thin film transistor due to entry of extraneous light. An array substrate includes a glass substrate, a plurality of thin film transistors, a plurality of pixel electrodes, and a metal film. The plurality of thin film transistors are provided to the glass substrate. The plurality of pixel electrodes are spaced apart from each other and driven by the thin film transistors. The plurality of pixel electrodes reflect extraneous light entering the reflective type display device from a counter substrate side. The metal film is provided between a gap between the pixel electrodes and each of the thin film transistors.

3 Claims, 8 Drawing Sheets

REFLECTIVE TYPE DISPLAY DEVICE

INCORPORATION BY REFERENCE

The present invention claims priority under 35 U.S.C. §119 to Japanese Patent Application Nos. 2014-227899 and 2015-157947 filed on Nov. 10, 2014 and Aug. 10, 2015, respectively. The contents of these applications are incorporated herein by reference in their entirety.

FIELD

Embodiments described herein relate generally to a reflective type display device including a non-display side substrate with a plurality of pixel electrodes that reflect extraneous light entering the reflective type display device from a display side substrate side through a light modulating layer toward the display side substrate side.

BACKGROUND

A liquid crystal display device (LCD) conventionally includes an array substrate, a counter substrate, and a liquid crystal layer as a light modulating layer interposed between these substrates. The liquid crystal display device is broadly divided into a transmissive type, a reflective type, and a semi-transmissive type as a combination of the transmissive type and the reflective type. In the transmissive type, light irradiated from a back surface side (rear surface side) of an array substrate corresponding to a non-display side thereof using a backlight unit is caused to pass through the display device, thereby displaying an image. In the reflective type, light entering the display device from a display side of a counter substrate, specifically a front surface side thereof, is reflected on a pixel electrode provided to an array substrate, thereby displaying an image.

In the liquid crystal display device, a thin film transistor to drive the pixel electrode is located on a back surface side of the pixel electrode. In light of this configuration, in the case of the transmissive type or semi-transmissive type liquid crystal display device, part of light emitted from the backlight unit located on the back surface side of the array substrate and entering the array substrate is likely to enter the thin film transistor. This entry of light causes light leakage that brings about flicker or the like, leading to reduction in display quality in some cases. By contrast, in the case of the reflective type liquid crystal display device, only the extraneous light enters the display device from a front surface side thereof. Thus, the reflective type liquid crystal display device has conventionally been considered not to permit entry of light into the thin film transistor easily and therefore light leakage has been considered unlikely in this display device.

However, recently, even in reflective type liquid crystal display devices, it has been recognized that light leakage into the thin film transistor may occur in some cases. Thus, suppressing entry of extraneous light into the thin film transistor has been desired even in reflective type liquid crystal display devices.

DETAILED DESCRIPTION

A reflective type display device of an embodiment includes a display side substrate, a non-display side substrate disposed at a position facing the display side substrate, and a light modulating layer that modulates light. The light modulating layer is interposed between the display side substrate and the non-display side substrate. The non-display side substrate includes a non-display side substrate body, a plurality of thin film transistors, a plurality of pixel electrodes, and an extraneous light entry suppressing layer. The plurality of thin film transistors are provided to the non-display side substrate body. The plurality of pixel electrodes are spaced apart from each other and driven by the thin film transistors. The plurality of pixel electrodes reflect light entering the reflective type display device from the display side substrate side. The extraneous light entry suppressing layer is provided between a gap between the plurality of pixel electrodes and each of the thin film transistors.

The configuration of a first embodiment is described below by referring to FIGS. 1 to 4.

Figure 4:
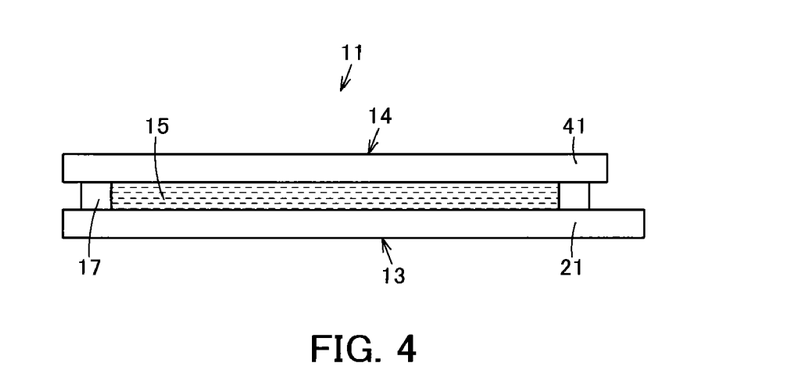
FIG. 4 is a sectional view showing an outline of the same reflective type display device.

Referring to FIG. 4, reference numeral 11 shows an active matrix reflective type liquid crystal display device as a reflective type display device. As an outline, the reflective type liquid crystal display device 11 includes an array substrate 13 corresponding to a first substrate as a non-display side substrate, a counter substrate 14 corresponding to a second substrate as a display side substrate, and a liquid crystal layer 15 corresponding to a light modulating layer interposed between the substrates 13 and 14. In the reflective type liquid crystal display device 11, a gap holding member (spacer) not shown in the drawings for holding a gap is interposed between the substrates 13 and 14. Further, a sealing member 17 made of an ultraviolet-curable resin or a thermosetting resin or the like, for example, is provided around the liquid crystal layer 15 to seal the liquid crystal layer 15. In the description below, the reflective type liquid crystal display device 11 is simply abbreviated to display device 11.

Figure 1:
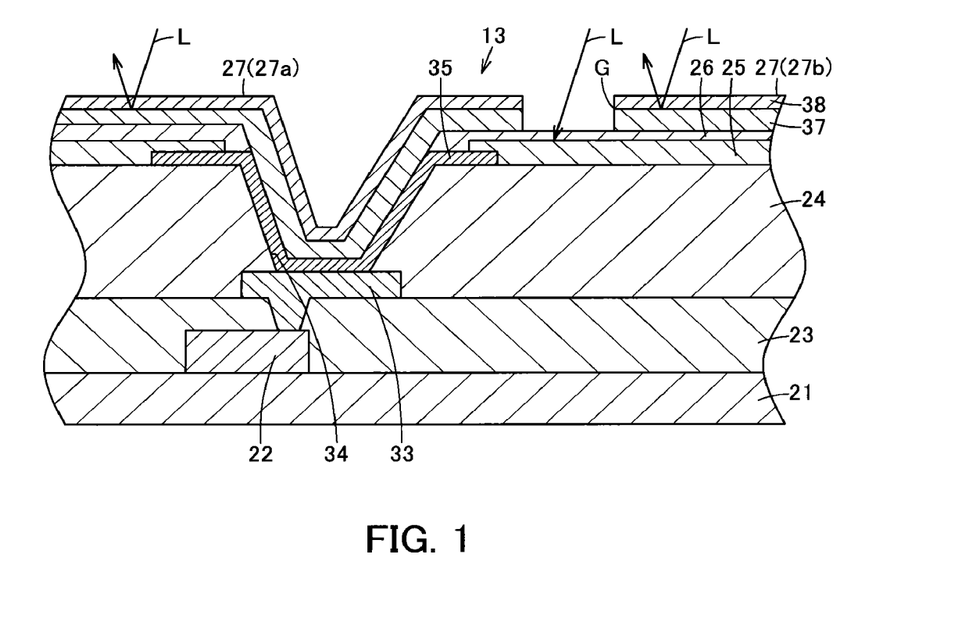
FIG. 1 is a sectional view schematically showing a part of a non-display side substrate of a reflective type display device of a first embodiment in an enlarged manner.

As shown in FIG. 1, the array substrate 13 includes a glass substrate 21 corresponding to a non-display side substrate body (first substrate body) having light transmitting properties and insulating properties, a thin film transistor 22 corresponding to a switching element provided on the glass substrate 21, an interlayer insulation film 23 and a flattening film 24, corresponding to a flattening layer, that cover the thin film transistor 22, a metal film 25 corresponding to a light shielding layer as an extraneous light entry suppressing layer directly contacting the flattening film 24 on the flattening film 24, an insulation film 26 provided on the metal film 25, and a plurality of pixel electrodes 27 provided on the insulation film 26. The array substrate 13 further includes scanning lines 28 (FIG. 2) and signal lines 29 (FIG. 2) insulated from each other and disposed in a lattice pattern. The array substrate 13 further includes an alignment film not shown in the drawings provided to cover the pixel electrodes 27 entirely.

Although not shown in the drawings, an undercoat layer or the like for flattening, for example, is provided on the glass substrate 21. Instead of the glass substrate 21, the array substrate 13 may include any substrate having light transmitting properties and insulating properties such as a substrate made of a synthetic resin.

Figure 2:
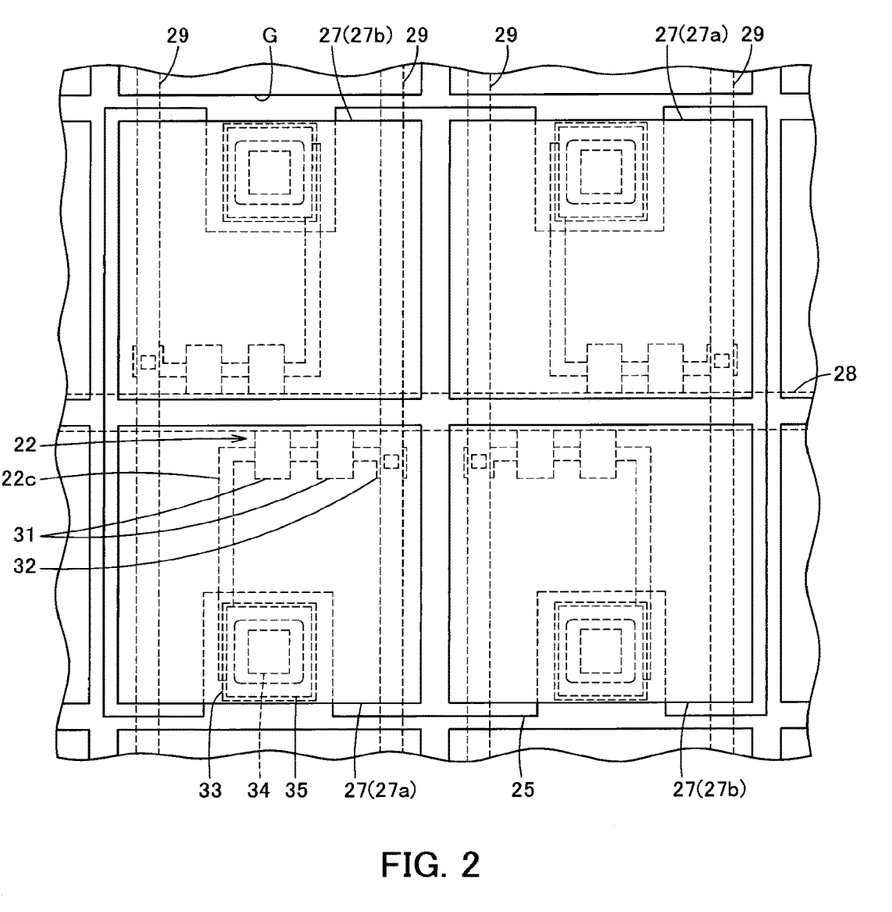
FIG. 2 is a plan view schematically showing a part of the same non-display side substrate in an enlarged manner.

The thin film transistor 22 is to drive the pixel electrodes 27. The thin film transistor 22 may be of a top gate type (staggered type) or a bottom gate type (inverse staggered type), for example. In this embodiment, a thin film transistor 22 of the top gate type is used, for example. As shown in FIG. 2, the thin film transistor 22 includes a semiconductor layer 22c, a gate electrode 31 facing a channel region of the semiconductor layer 22c, a source electrode 32 electrically connected to a source region of the semiconductor layer 22c, and a drain electrode 33 electrically connected to a drain region of the semiconductor layer 22c. The thin film transistor 22 is located at each intersection of the scanning lines 28 and the signal lines 29. In this way, the thin film transistors 22 are disposed in a matrix. In each thin film transistor 22, the gate electrode 31 is electrically connected to the scanning line 28, the source electrode 32 is electrically connected to the signal line 29, and the drain electrode 33 is electrically connected to the pixel electrode 27 via a contact hole 34 provided in the flattening film 24 (FIG. 1) and a conductive layer 35 provided in the contact hole 34.

Referring back to FIG. 1, the conductive layer 35 is provided on the flattening film 24 and is made of a transparent conductive material such as ITO, for example.

The interlayer insulation film 23 is to insulate the gate electrode 31 from the source electrode 32 and the drain electrode 33 of the thin film transistor 22. The interlayer insulation film 23 is made of a silicon oxide film, a silicon nitride film, or a synthetic resin film, for example.

The flattening film 24 is an organic insulation film having light transmitting properties, for example. The flattening film 24 is to form the pixel electrode 27 located above the flattening film 24 into a flat shape by absorbing a level difference between layers on a lower side of the flattening film 24.

The metal film 25 is provided directly above the flattening film 24, specifically, the metal film 25 directly contacts the flattening film 24. The metal film 25 is made of a metal having conductive properties such as molybdenum (Mo) or molybdenum tungsten (MoW), for example. For example, the metal film 25 is disposed at a position facing a gap G between a pixel electrode 27a and a pixel electrode 27b adjacent to each other to prevent entry of extraneous light L through the gap G. Disposing the metal film 25 at the position facing the gap G between the adjacent pixel electrodes 27a and 27b is a minimum requirement for the metal film 25 to function to prevent entry of the extraneous light L. However, in this embodiment, in order for an auxiliary capacitance electrically connected to the pixel electrode 27a to be formed between the pixel electrode 27a, the pixel electrode 27b adjacent to the pixel electrode 27a, and the metal film 25 using the insulation film 26, the metal film 25 is electrically connected to the pixel electrode 27a via the conductive layer 35 while extending so as to face the pixel electrodes 27a and 27b, for example. Specifically, the metal film 25 is provided between the thin film transistor 22 and a gap (gap G) between the plurality of pixel electrodes 27a and 27b.

The insulation film 26 is to prevent continuity between the metal film 25 and the pixel electrode 27b. Further, the insulation film 26 is interposed between the metal film 25 and the pixel electrodes 27 to form the auxiliary capacitance. The insulation film 26 is provided directly on the metal film 25, specifically, the insulation film 26 directly contacts the metal film 25. The insulation film 26 is made of a silicon nitride film or the like, for example. The insulation film 26 does not have light transmitting properties, for example, and is located at the gap G between the pixel electrodes 27a and 27b to function as a light shielding layer.

The pixel electrodes 27 correspond to each of the thin film transistors 22 and are provided above the corresponding thin film transistors 22 in a matrix. In other words, the thin film transistors 22 are located on back surfaces of the pixel electrodes 27. The pixel electrodes 27 each include a reflection layer 37 that reflects light and a work function adjusting layer 38 stacked on the reflection layer 37. The pixel electrodes 27 are reflecting pixel electrodes that reflect the extraneous light L. The pixel electrodes 27a and pixel electrodes 27b are provided spaced (separated) apart from each other.

The reflection layer 37 is made of aluminum or silver, for example. Alternatively, the reflection layer 37 is made of a compound or an alloy or the like containing aluminum or silver as one component, for example.

The work function adjusting layer 38 is provided to adjust the work function of the reflection layer 37 relative to a counter electrode 43 of the counter substrate 14 (FIG. 3) described later. For example, the work function adjusting layer 38 is made of the same material as the counter electrode 43 that may be a transparent conductive material such as ITO or IZO, for example.

Figure 3:
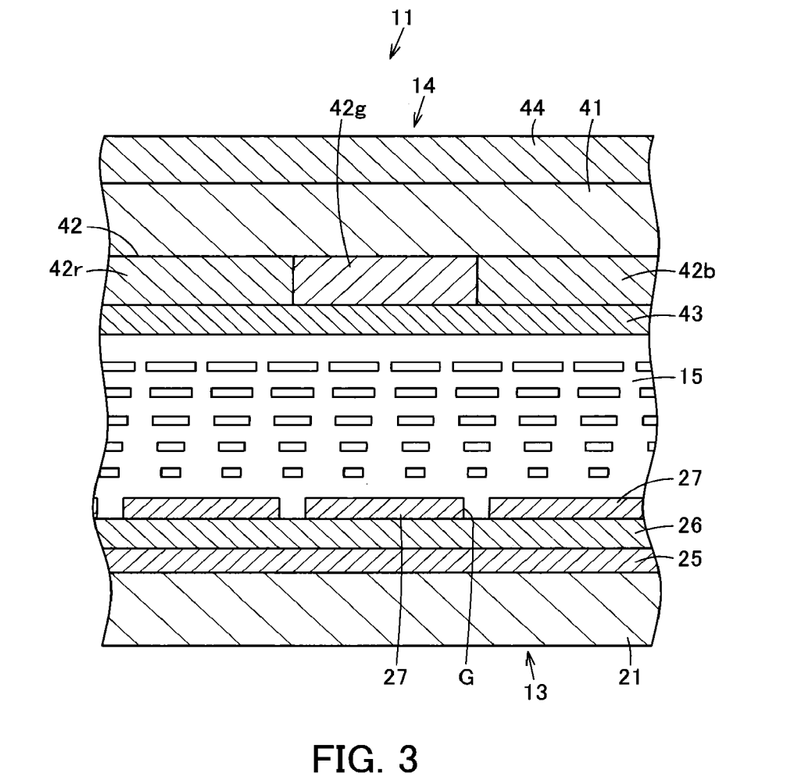
FIG. 3 is an explanatory view schematically showing the same reflective type display device.

The counter substrate 14 shown in FIG. 3 includes a glass substrate 41 corresponding to a display side substrate body (second substrate body) having light transmitting properties and insulating properties. The counter substrate 14 further includes a color filter (CF) layer 42, the counter electrode (transparent electrode) 43, and an alignment film not shown in the drawings, that are located to be closer to the liquid crystal layer 15 than the glass substrate 41. The counter electrode 43 is a common electrode provided on the color filter layer 42. The alignment film covers the counter electrode 43 and is intended for alignment of liquid crystal molecules in the liquid crystal layer 15 together with the alignment film of the array substrate 13 side. The counter substrate 14 further includes a polarizing plate 44, etc. A retardation plate integral with the polarizing plate 44, for example, may also be provided. Instead of the glass substrate, the counter substrate 14 may be any substrate having light transmitting properties and insulating properties such as a substrate made of a synthetic resin, for example.

The color filter layer 42 includes a filter part 42r, a filter part 42g, and a filter part 42b corresponding to red, green, and blue, for example, respectively, and a light shielding part (black matrix) not shown in the drawings that partitions the color filter layer 42 into the filter parts 42r, 42g, and 42b and blocks unnecessary light. Each of the filter parts 42r, 42g, and 42b is provided for a corresponding one of the pixel electrodes 27. The arrangement of the filter parts 42r, 42g, and 42b of the color filter layer 42 and the colors thereof can be set in any way that can achieve colored display on the display device 11.

The counter electrode 43 is a common electrode common to the plurality of pixel electrodes 27. In this embodiment, the counter electrode 43 is common to all the pixel electrodes 27, for example. The counter electrode 43 is provided in a region corresponding to all pixel electrodes 27 and is made of a transparent conductive material such as ITO or IZO, for example.

Various modes including the TN mode, for example, can be employed for the liquid crystal layer 15. For example, the twisted nematic (TN)—normally white (NW) mode is employed for the liquid crystal layer 15.

As shown in FIGS. 1 to 4, in the above described display device 11, each thin film transistor 22 drives a corresponding pixel electrode 27 individually in response to a signal from the scanning line 28. In response to a potential difference set between each pixel electrode 27 and the counter electrode 43 based on a signal from the signal line 29, the liquid crystal molecules in the liquid crystal layer 15 are operated. In this state, the extraneous light L entering the display device 11 from a counter substrate 14 side is reflected on the reflection layer 37 of each pixel electrode 27. As a result, the transmittance of light reflected on each pixel electrode 27 is set in a manner that depends on the angles of the liquid crystal molecules in the liquid crystal layer 15 and the reflected light having passed through the color filter layer 42 is displayed as an image.

The extraneous light L entering the gap G between the adjacent pixel electrodes 27a and 27b is reflected on and absorbed by the metal film 25 (insulation film 26) located at the gap G, thereby blocking entry of the extraneous light L into the thin film transistor 22. This can suppress (prevent) light leakage into the thin film transistor 22 due to entry of the extraneous light L.

The auxiliary capacitance is formed by locating the metal film 25 to block entry of the extraneous light L into the thin film transistor 22 on a back surface side of the pixel electrodes 27 and interposing the insulation film 26 between the metal film 25 and the pixel electrodes 27. In this way, high definition is achieved by using the metal film 25 and the insulation film 26 effectively without the need for forming an auxiliary capacitance separately.

Figure 5:
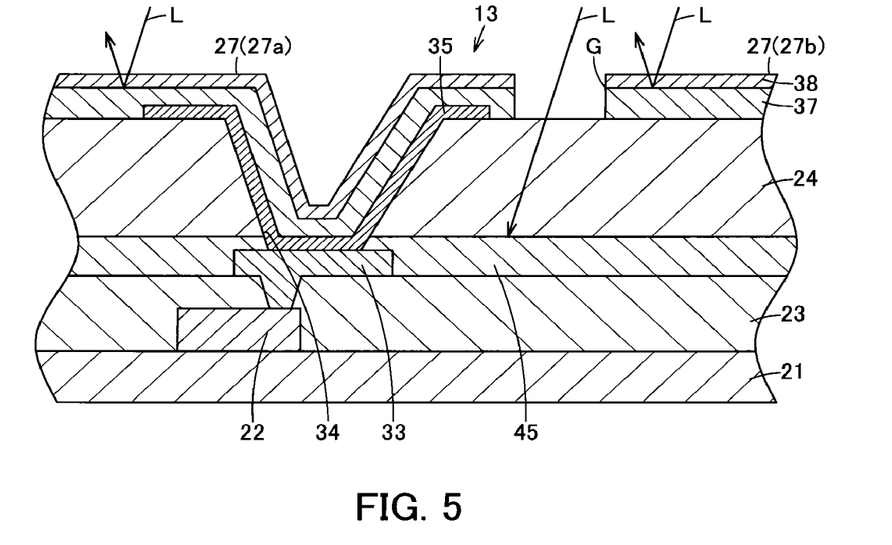
FIG. 5 is a sectional view schematically showing a part of a non-display side substrate of a reflective type display device of a second embodiment in an enlarged manner.

A second embodiment is described next by referring to FIG. 5. Configurations and effects of the second embodiment that are the same as those of the above-described first embodiment are identified by the same signs and the description thereof will be omitted.

In the second embodiment, instead of the metal film 25 of the above-described first embodiment, a black resist 45 made of a synthetic resin is provided as a light shielding layer corresponding to an extraneous light entry suppressing layer.

The black resist 45 contains black pigment and has light shielding properties. The black resist 45 is located between the interlayer insulation film 23 and the flattening film 24 and functions as an underlayer for the flattening film 24 on which the pixel electrodes 27 are stacked. Specifically, the black resist 45 is provided on a substantially entire surface of the interlayer insulation film 23 so as to cover the interlayer insulation film 23 except on a place where the drain electrode 33 and the conductive layer 35 (pixel electrode 27) contact each other. The black resist 45 has a thickness from 0.3 to 0.5 μm, for example. The black resist 45 has an optical density (optical concentration), specifically an OD, of 3 or more, preferably 3.5 or more.

The extraneous light L entering the display device 11 through the gap G between the adjacent pixel electrodes 27a and 27b passes through the flattening film 24. Then, the extraneous light L is reflected on and absorbed by the black resist 45, thereby blocking entry of the extraneous light L into the thin film transistor 22. This can suppress (prevent) light leakage into the thin film transistor 22 due to entry of the extraneous light L.

Entry of the extraneous light L into the thin film transistor 22 is blocked with the black resist 45 as an underlayer for the flattening film 24 on which the pixel electrodes 27 are stacked. This can achieve a light shielding effect easily. Further, compared to a case where a metal film is provided or the like, for example, this can achieve process saving in that processes such as sputtering, etching, peeling and the like are not required. As a result, manufacturing costs can be reduced further.

Additionally, the black resist 45 is provided under the flattening film 24. This can make the black resist 45 less influential in terms of adhesion of the pigment in the black resist 45 to a chamber for sputtering and CVD, for example, that occurs in a process to be performed after formation of the flattening film 24. This can ensure reliability of the process to be performed after formation of the flattening film 24.

In at least one of the aforementioned embodiments, the extraneous light L entering the display device 11 through at least the gap between the pixel electrodes 27a and 27b is blocked with the metal film 25 or the black resist 45. This can make it reliably more unlikely that the extraneous light L will enter the thin film transistor 22.

Specifically, in the case of the reflective type liquid crystal display device 11, it is considered that the extraneous light L entering the display device 11 through the gap between the pixel electrodes 27a and 27b is reflected plurality of times inside the display device 11 and light particularly reflected on the reflection layer 37 of the pixel electrodes 27 enters the thin film transistor 22 to cause light leakage. Thus, by placing the metal film 25 at the gap between the pixel electrodes 27a and 27b and blocking light or by covering a place over the thin film transistor 22 with the black resist 45 and blocking light, plurality of reflection of light and entry of the light into the thin film transistor 22 can be prevented completely.

Figure 6:
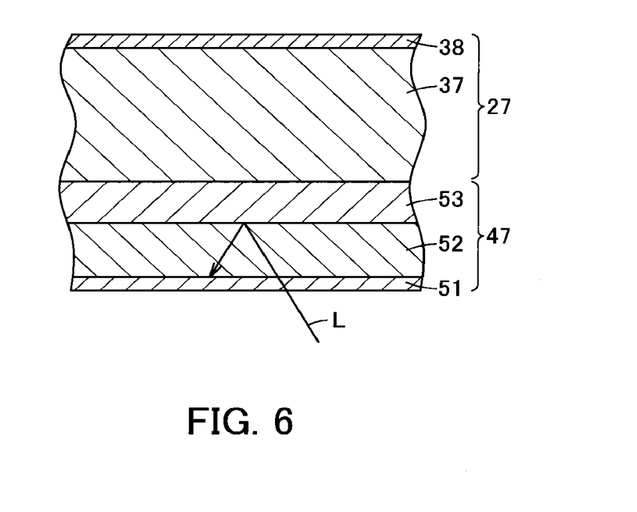
FIG. 6 is a sectional view schematically showing an extraneous light entry suppressing layer of a reflective type display device of a third embodiment in an enlarged manner.
Figure 7:
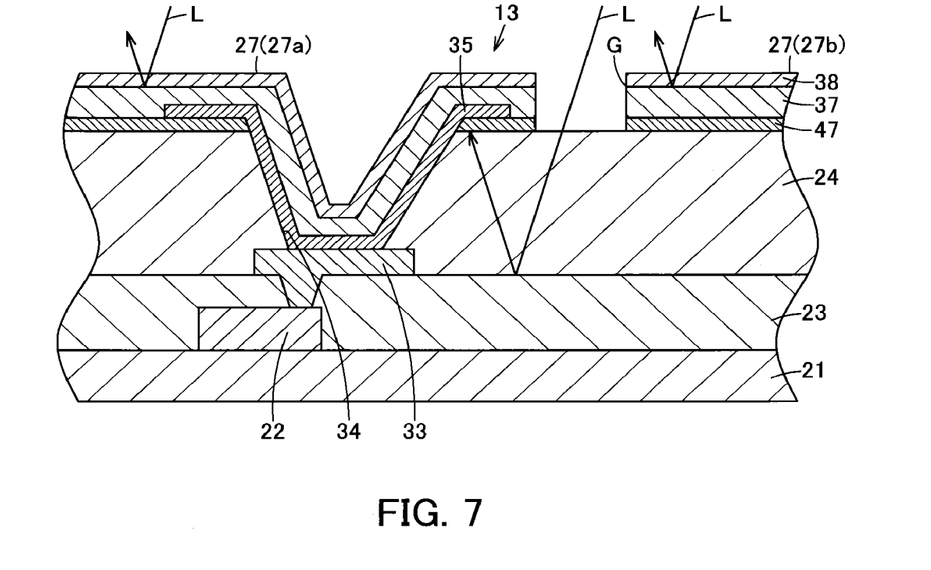
FIG. 7 is a sectional view schematically showing a part of a non-display side substrate of the same reflective type display device of the third embodiment in an enlarged manner.

A third embodiment is described next by referring to FIGS. 6 and 7. Configurations and effects of the third embodiment that are the same as those of each of the aforementioned embodiments are identified by the same signs and the description thereof will be omitted.

In the third embodiment, a half mirror 47 that permits transmission of light only from a non-display side toward a display side is interposed as an extraneous light entry suppressing layer between at least a partial non-display side of the pixel electrodes 27 and each of the thin film transistor 22.

The half mirror 47 is configured by a semi-transmissive layer 51 for letting some light pass through while reflecting the rest and a transmissive layer 52 for letting light pass through. The half mirror 47 is electrically connected to the pixel electrodes 27 (reflection layer 37) via a conductive layer 53. In the half mirror 47, the semi-transmissive layer 51 and the transmissive layer 52 are stacked in this order. Thus, the transmissive layer 52 is sandwiched between the semi-transmissive layer 51 and the conductive layer 53, the semi-transmissive layer 51 is separated from the pixel electrodes 27 (reflection layer 37), and the conductive layer 53 tightly contacts the pixel electrodes 27 (reflection layer 37).

The semi-transmissive layer 51 is made of metal having conductivity, such as molybdenum, for example, and is formed to be thinner than the pixel electrodes 27 (reflection layer 37). The semi-transmissive layer 51 is about 5 nm in thickness, for example.

The transmissive layer 52 is made of a transparent material having conductivity such as ITO, for example, and formed to be thicker than the semi-transmissive layer 51. The transmissive layer 52 is from about 30 to about 50 nm in thickness, for example. The transmissive layer 52 is provided so as to cover a metal portion of a pad part not shown in the drawings that is pulled out of a display region for connection between the display device 11 and an external driving circuit not shown in the drawings.

The conductive layer 53 is to make the half mirror 47 tightly contact the pixel electrodes 27 (reflection layer 37) and to form continuity between the half mirror 47 and the pixel electrodes 27 (reflection layer 37). The conductive layer 53 is made of a metal having conductivity such as molybdenum, for example, and is formed to be thicker than the semi-transmissive layer 51.

In this way, the half mirror 47 is located on the back surface side of the pixel electrodes 27 at a position including a contact part (conductive layer 53) between the thin film transistor 22 (drain electrode 33) and the pixel electrodes 27 and a place near the contact part, specifically, in a place above the thin film transistor 22. Alternatively, the half mirror 47 may be provided to extend across the entire back surface side of the pixel electrode 27.

To provide the half mirror 47, after the contact hole is provided in the flattening film 24, the semi-transmissive layer 51 and the transmissive layer 52 are deposited and patterned in this order. Next, the conductive layer 53, the reflection layer 37, and the work function adjusting layer 38 are deposited and patterned sequentially on the flattening film 24 so as to cover the transmissive layer 52, thereby forming the pixel electrodes 27.

The extraneous light L entering the display device 11 through the gap G between the adjacent pixel electrodes 27a and 27b is reflected on an interface or the like between the flattening film 24 and the interlayer insulation film 23. The reflected extraneous light L enters the half mirror 47 and passes through the semi-transmissive layer 51 and the transmissive layer 52. Then, the extraneous light L is reflected again on the conductive layer 53 (pixel electrodes 27 (reflection layer 37)). Meanwhile, the extraneous light L does not pass through the semi-transmissive layer 51 from an upper side of the drawings corresponding to the display side toward a lower side of the drawings corresponding to the non-display side. This produces an interference effect with light entering the semi-transmissive layer 51 to suppress entry of the extraneous light L into the thin film transistor 22. Specifically, by providing the half mirror 47 that permits transmission of light only from the non-display side toward the display side between the non-display side of the pixel electrodes 27 and the thin film transistor 22, light leakage into the thin film transistor 22 due to entry of the extraneous light L can be suppressed.

Specifically, in the case of the reflective type liquid crystal display device 11, it is considered that the extraneous light L entering the display device 11 through the gap between the pixel electrodes 27a and 27b is reflected plurality of times inside the display device 11 and light particularly reflected on the reflection layer 37 of the pixel electrodes 27 enters the thin film transistor 22 to cause light leakage. Thus, with the half mirror 47 located on the back surface sides of the pixel electrodes 27a and 27b, the plurality of reflection is suppressed, so that entry of light into the thin film transistor 22 can be suppressed.

Further, the half mirror 47 can be formed together during provision of the pixel electrodes 27, thereby avoiding increase in the number of processes.

Figure 8:
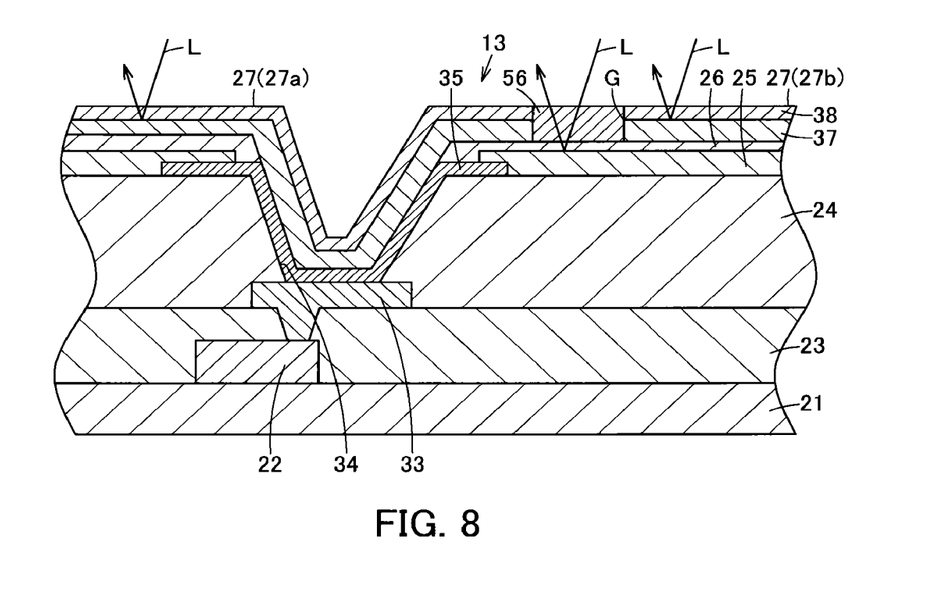
FIG. 8 is a sectional view schematically showing a part of a non-display side substrate of a reflective type display device of a fourth embodiment in an enlarged manner.

A fourth embodiment is described next by referring to FIGS. 8 to 10. Configurations and effects of the fourth embodiment that are the same as those of each of the aforementioned embodiments are identified by the same signs and the description thereof will be omitted.

In the fourth embodiment, the twisted nematic (TN)-normally white (NW) mode is employed for the display device 11 of the aforementioned first embodiment and the gap G between the pixel electrodes 27 of the array substrate 13 of the first embodiment is covered with a retardation layer 56.

The retardation layer 56 is a λ/4 retardation layer. Photopolymerizable liquid crystal with which a pattern can be formed at a designated position is used effectively as a material for the retardation layer 56. Examples of the material usable for the retardation layer 56 include ultraviolet-curable liquid crystal, a reactive mesogen (reactive polymer) material or the like, and a mixture of these liquid crystal materials. With these liquid crystal materials to be used as materials, the retardation layer 56 can be patterned by being exposed to light partially and the state of alignment, specifically a phase difference, can be set by selecting the material.

Figure 9:
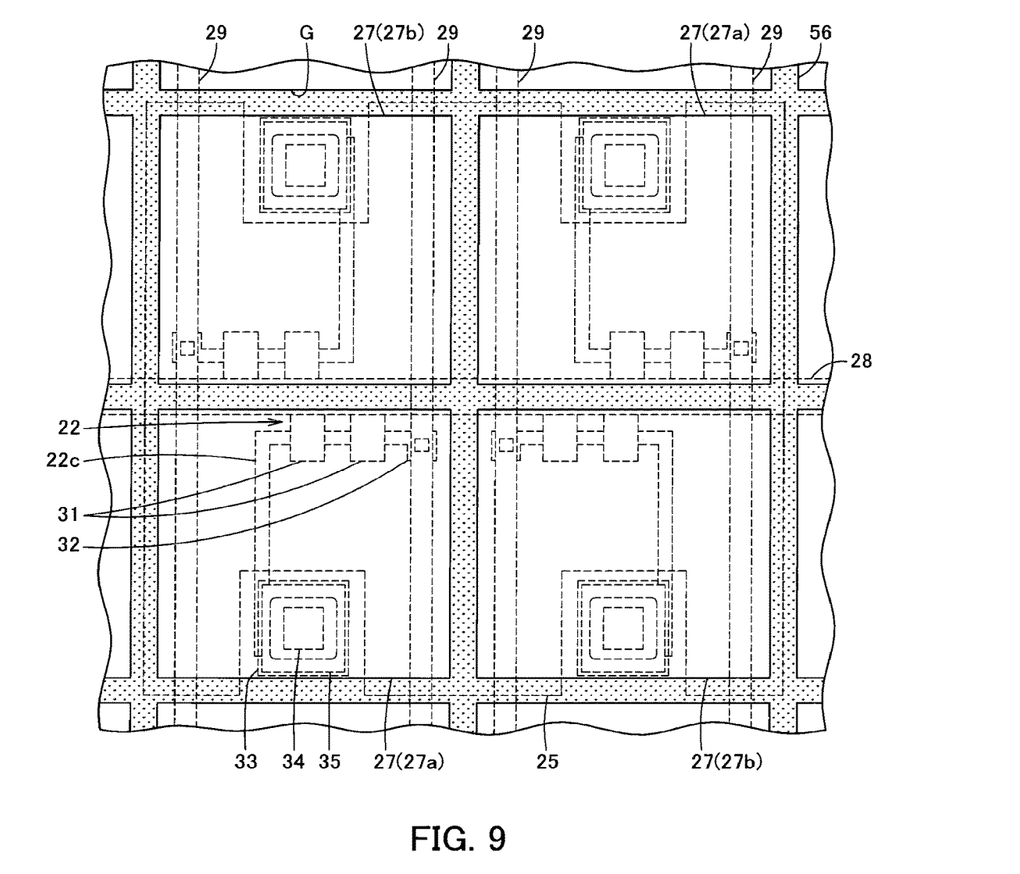
FIG. 9 is a plan view schematically showing a part of the non-display side substrate of the fourth embodiment in an enlarged manner.

As shown in FIG. 9, the retardation layer 56 is disposed so as to cover the gap G between the adjacent pixel electrodes 27a and 27b. As a result, the retardation layer 56 is formed for example in a lattice shape in a plan view.

Further, the polarizing plate 44 of the counter substrate 14 is accompanied by a retardation plate 58. The retardation plate 58 is a λ/4 retardation plate, for example, and is provided integrally with the polarizing plate 44. The retardation plate 58 is interposed between the polarizing plate 44 and the glass substrate 41.

Figure 10:
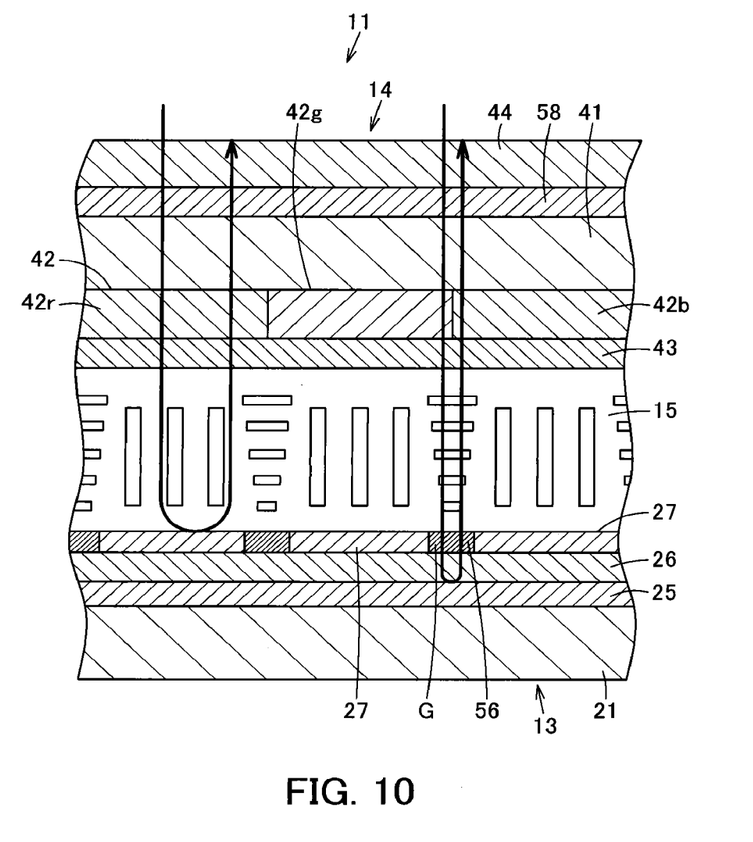
FIG. 10 is an explanatory view schematically showing a black display state on the same reflective type display device of the fourth embodiment.

FIG. 10 schematically shows a black display state on the display device 11. In this state, liquid crystal molecules between the pixel electrodes 27, 27 do not move. Thus, in the case of the display device 11 in the normally white mode, the polarizing direction of light to pass through the gap between the pixel electrodes 27, 27 after passing through the polarizing plate 44 is not rotated. In the absence of the retardation layer 56, this light is reflected as it is on the metal film 25 and the resultant reflected light passes through the polarizing plate 44, thereby causing the risk of light leakage. In this regard, in this embodiment, the gap G between the pixel electrodes 27, 27 is covered with the retardation layer 56 to change the phase of light entering the gap G between the pixel electrodes 27, 27. This light is further reflected on the metal film 25 and then passes through the retardation layer 56 again, thereby changing the phase of this light. More specifically, due to the presence of the λ/4 retardation layer provided as the retardation layer 56, the light entering the gap between the pixel electrodes 27, 27 and reflected on the metal film 25 differs by λ/2 in phase from incoming light, so that this light is absorbed by the polarizing plate 44 and does not cause light leakage. In this way, reduction in contrast can be suppressed.

Figure 11:
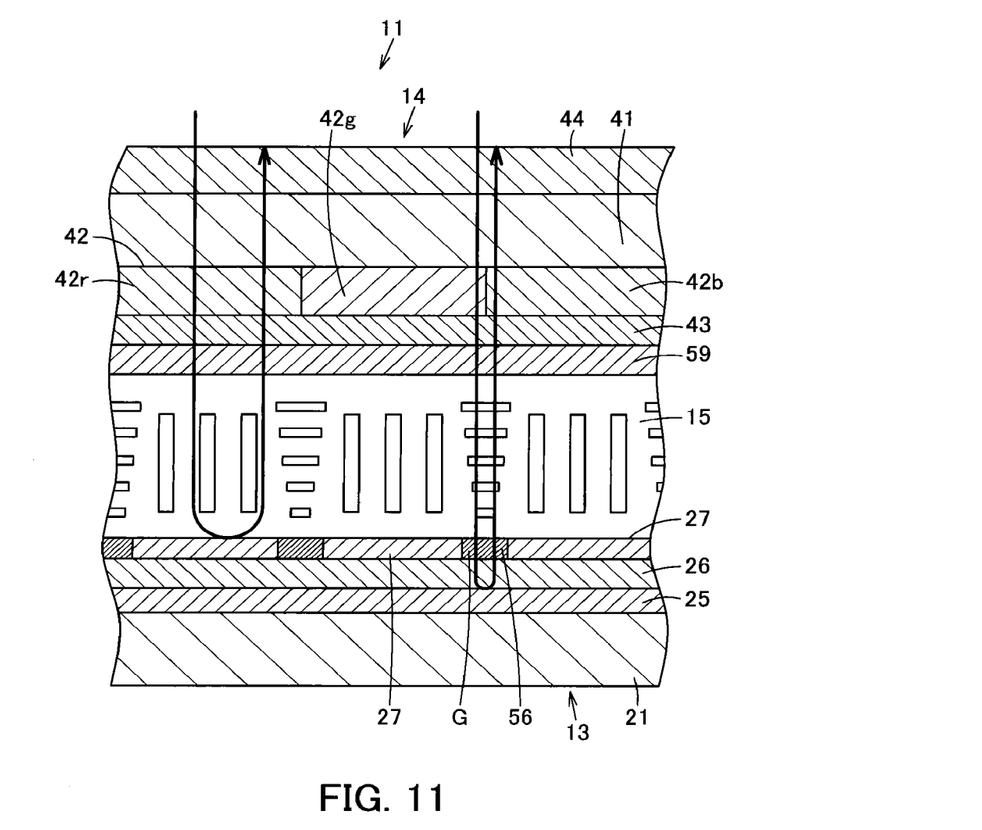
FIG. 11 is an explanatory view schematically showing the operation of a reflective type display device of a fifth embodiment.

In the aforementioned fourth embodiment, instead of the retardation plate 58, a retardation layer (in-cell retardation layer) 59 may be provided on an entire surface of the counter substrate 14 on the liquid crystal layer 15 side, as in a fifth embodiment shown in FIG. 11. In this case, the display device 11 (counter substrate 14) can be thinner to achieve thickness reduction.

In at least one of the aforementioned embodiments, light leakage into the thin film transistor 22 due to entry of extraneous light can be suppressed. Thus, the display device 11 provided herein achieves high reliability by suppressing reduction in display quality caused by flicker or the like due to the light leakage.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A reflective type display device comprising:
   a display side substrate;
   a non-display side substrate disposed at a position facing the display side substrate; and
   a light modulating layer that modulates light, the light modulating layer being interposed between the display side substrate and the non-display side substrate, wherein
   the non-display side substrate comprises:
   a non-display side substrate body;
   a plurality of thin film transistors provided to the non-display side substrate body;
   a plurality of pixel electrodes spaced apart from each other and driven by the thin film transistors, the plurality of pixel electrodes reflecting light entering the reflective type display device from a display side substrate side;
   an extraneous light entry suppressing layer provided between a gap between the plurality of pixel electrodes and each of the thin film transistors, the extraneous light entry suppressing layer being a light shielding layer; and
   a retardation layer that covers the light shielding layer between the pixel electrodes, and
   the light shielding layer is a metal film facing a back surface side of the pixel electrodes while an insulation film is interposed between the pixel electrodes and the metal film.

2. The reflective type display device according to claim 1, wherein the retardation layer is a λ/4 retardation layer.

3. The reflective type display device according to claim 1, wherein the light modulating layer is a liquid crystal layer.

* * * * *